H. W. BABCOCK.

DENTAL PROCESS.

APPLICATION FILED FEB. 26, 1918.

Reissued June 18, 1918. 14,487.

WITNESS

R. R. Rousseau

INVENTOR

Henry Ward Babcock,

BY Munn & Co.

ATTORNEYS

UNITED STATES PATENT OFFICE.

HENRY WARD BABCOCK, OF ONARGA, ILLINOIS.

DENTAL PROCESS.

14,487. Specification of Reissued Letters Patent. Reissued June 18, 1918.

Original No. 1,248,242, dated November 27, 1917, Serial No. 176,982, filed June 26, 1917. Application for reissue filed February 26, 1918. Serial No. 219,328.

*To all whom it may concern:*

Be it known that I, HENRY WARD BABCOCK, a citizen of the United States, and a resident of Onarga, in the county of Iroquois and State of Illinois, have invented certain new and useful Improvements in Dental Processes, of which the following is a specification.

My invention is an improvement in dental processes, and has for its object to provide a simple, inexpensive and easy method of crowning teeth by the so-called jacket crown, wherein the method may be carried out by the average dentist without special equipment, and at a reasonable fee.

A further object of the invention is to provide a new and improved jacket crown, by means of which the average dentist may carry out the process to completion without special equipment.

Figure 4:
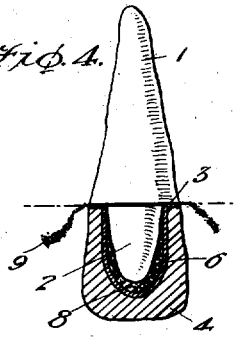
Fig. 4 is a similar view showing the jacket crown in place on the root.
Figure 5:
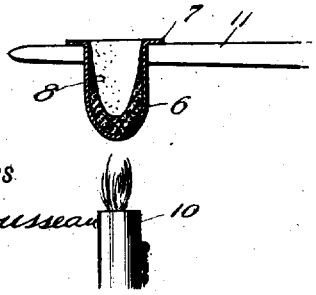
Fig. 5 is a sectional view showing the method of evaporating the mercury from the amalgam.
Figure 6:
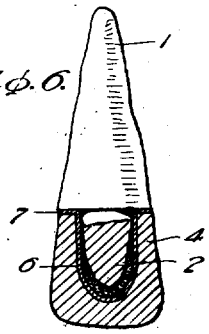
Fig. 6 is a sectional view showing the completed artificial porcelain crown on the natural tooth.

In the present embodiment of the invention, the crown of the tooth 1 is first cut down, as indicated at 2, to form a shoulder 3 between the root and the prepared portion of the tooth. A jacket crown of porcelain 4 of suitable size and color and having a cavity 5 large enough to receive the prepared portion 2 of the tooth loosely is next obtained, and a matrix 6 of pure gold and of a size to accurately fit within the cavity 5 is placed therein and the said matrix has a marginal flange 7 at its open end which will extend to the outer or peripheral surface of the jacket 4. In this matrix is now placed amalgamated gold indicated at 8, there being a sufficient amount of this amalgamated gold to fill the space between the prepared portion 2 of the tooth and the matrix. The matrix and jacket, with the amalgam in place, are now pressed over the tooth, as indicated in Fig. 4, until the crown fits down closely against the shoulder 3. The excess amalgam is forced out as indicated at 9. The matrix and jacket are now removed, and the matrix is removed from the jacket, and the matrix and amalgam are held over a burner indicated at 10 by any suitable instrument indicated at 11, and the mercury is evaporated by slow heat.

When this operation has been completed, it is advisable to paint the prepared crown of the tooth with a so-called cavity lining, or high grade shellac or varnish. Cement is then mixed to the proper consistency and a small amount of cement is placed in the crown or jacket. The matrix is then set lightly in the crown to avoid any possible disturbance of the matrix and after cement has been placed in the matrix both crown or jacket and matrix are placed on the tooth. The jacket or crown is matteled lightly into place, pressing out the excess cement. With this process there is attained an accurate conformation of the interior of the gold matrix and the tooth by means of the gold amalgam, so that the matrix and crown of the tooth are made to accurately fit one another. It will be understood that other materials may be used as well as gold.

In the usual method of crowning teeth by the so-called jacket crown, the tooth is prepared in the manner shown and a pure platinum matrix is burnished over the cone shaped natural crown 2 of the tooth. A body of porcelain is then fused onto the matrix, a step which requires the highest ceramic art to obtain dense porcelain and correctness of shade or color. Furthermore, the platinum matrix will show dark and must be removed from the crown. With the present method the color of the porcelain is not changed and there is a perfect fit, the matrix being an integral part of the crown.

Figure 1:
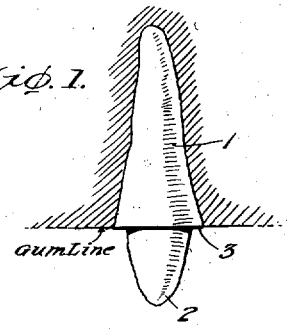
Figure 1 shows the first step of the process, namely, the preparing of the natural tooth crown.
Figure 2:
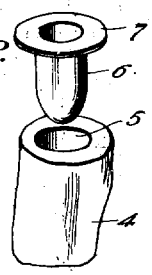
Fig. 2 is a perspective view of the jacket crown with the matrix removed.
Figure 3:
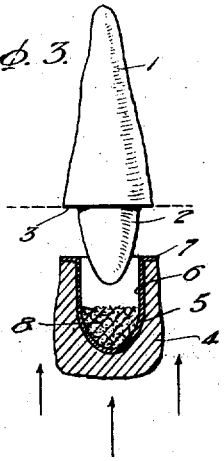
Fig. 3 is a sectional view showing the matrix in place and with the amalgam in the matrix ready for the insertion of the natural tooth.

The improved jacket crown consists of the artificial porcelain crown 4 having the cavity 6 of a size to loosely receive the prepared portion 2 of the tooth, and having arranged therein the matrix 6 of pure gold and fitting within the crown. These jackets so prepared may be carried by dentists and may be applied to any tooth, merely by preparing the crown 2 of the tooth in the manner shown in Fig. 1, afterward placing the amalgam in the crown and applying it as above set forth.

I claim:

1. A method of crowning teeth, which consists in reducing the crown of the tooth, providing a jacket having a cavity of larger size than the prepared crown, and placing in the cavity a matrix of gold, the matrix having a marginal flange extending to the peripheral surface of the jacket, placing gold amalgam in the matrix, pressing the prepared crown into the matrix to express the surplus amalgam, removing the matrix and jacket and heating to evaporate the mercury, and afterward cementing the jacket to the prepared crown.

2. A method of crowning teeth, which consists in reducing the crown of the tooth, providing a jacket having a cavity of larger size than the prepared crown, and placing in the cavity a matrix of metal, placing gold amalgam in the matrix, pressing the prepared crown into the matrix to express the surplus amalgam, removing the matrix and jacket and heating to evaporate the mercury, and afterward cementing the jacket to the prepared crown.

3. A method of crowning teeth which consists in reducing the peripheral surface of the crown of the tooth to form a prepared crown approximately circular in cross section and having the vertical section of a Gothic arch, and in forming an annular shoulder between the prepared crown and the root of the tooth, providing a jacket having a cavity of larger size than the prepared crown, placing in the cavity a matrix of metal, placing gold amalgam in the matrix, pressing the prepared crown into the matrix to express the surplus amalgam, removing the matrix and jacket and heating to evaporate the mercury and afterward securing the jacket to the prepared crown.

4. A method of crowning teeth, which consists in reducing the peripheral surface of the crown of the tooth to form a prepared crown approximately circular in cross section, and in forming an annular shoulder between the prepared crown and the root of the tooth, providing a jacket having a cavity of larger size than the prepared crown, placing gold amalgam in the matrix, pressing the prepared crown into the matrix to express the surplus amalgam, removing the matrix and jacket and heating to evaporate the mercury and afterward securing the jacket to the prepared crown.

5. A method of crowning teeth, which consists in reducing the peripheral surface of the crown of the tooth to form a prepared crown approximately circular in cross section, providing a jacket having a cavity of larger size than the prepared crown, placing in the cavity a matrix of metal, placing gold amalgam in the matrix, pressing the prepared crown into the matrix to express the surplus amalgam, removing the matrix and jacket and evaporating the mercury and afterward securing the jacket to the prepared crown.

6. A jacket crown for teeth of porcelain having a cavity of a size to receive the prepared crown of the natural tooth and having at the open end of the cavity a surface encircling the cavity and approximately perpendicular to the axis of the cavity and adapted to abut a shoulder formed between the natural tooth crown and the root, and having within the cavity a matrix of metal having a marginal flange fitting the said end surface of the porcelain jacket crown.

7. A jacket crown having a cavity of a size to receive the prepared crown of a natural tooth, and having the said cavity lined with a matrix of metal.

8. A tooth crown comprising a jacket crown having a cavity to receive a natural crown and a lining matrix formed to fit said cavity.

HENRY WARD BABCOCK.